United States Patent
Tanaami et al.

(10) Patent No.: US 11,947,738 B2
(45) Date of Patent: Apr. 2, 2024

(54) OPERATION SYSTEM AND OPERATION METHOD USING FORCE SENSOR, AND PROGRAM

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD, Aichi (JP)

( * ) Notice: Subject to any disclaimer, the term of this patent is extended or adjusted under 35 U.S.C. 154(b) by 0 days.

(21) Appl. No.: 17/580,752

(22) Filed: Jan. 21, 2022

(65) Prior Publication Data
US 2022/0236813 A1    Jul. 28, 2022

(30) Foreign Application Priority Data
Jan. 25, 2021    (JP) ................................ 2021-009880

(51) Int. Cl.
*G06F 3/0338*    (2013.01)

(52) U.S. Cl.
CPC .................................. *G06F 3/0338* (2013.01)

(58) Field of Classification Search
CPC ........ G06F 3/0338; G06F 3/011; G06F 3/016; G06F 2203/015; G06F 3/038; G06F 3/0414; G06F 3/14; B60K 2370/135; B60K 2370/774; B60K 2370/782; B60K 37/06; G01L 1/00
See application file for complete search history.

(56) References Cited

U.S. PATENT DOCUMENTS

| | | | |
|---|---|---|---|
| 2002/0074181 A1* | 6/2002 | Brandt | G05G 9/047 180/332 |
| 2004/0058730 A1* | 3/2004 | Ouchi | A63F 13/24 463/6 |
| 2005/0162389 A1 | 7/2005 | Obermeyer et al. | |
| 2005/0195166 A1* | 9/2005 | Cooper | G06F 3/038 345/161 |
| 2005/0256619 A1* | 11/2005 | Hayashi | B60C 23/0401 701/29.6 |
| 2007/0062789 A1* | 3/2007 | Glatz | E02F 9/2004 200/6 A |
| 2009/0076676 A1* | 3/2009 | Yamamoto | G06F 3/016 701/31.4 |
| 2009/0213073 A1 | 8/2009 | Obermeyer et al. | |
| 2010/0045624 A1* | 2/2010 | Hisatsugu | G01C 21/36 345/184 |
| 2010/0145555 A1* | 6/2010 | Hagerott | B64C 13/507 701/3 |
| 2011/0032186 A1* | 2/2011 | Genesin | G06F 3/0338 345/161 |
| 2012/0162076 A1 | 6/2012 | Obermeyer et al. | |

(Continued)

FOREIGN PATENT DOCUMENTS

JP    2011-090707 A    5/2011

*Primary Examiner* — David Tung
(74) *Attorney, Agent, or Firm* — Harness, Dickey & Pierce, P.L.C.

(57) ABSTRACT

An operation system includes: a force sensor; and a stick body configured to transmit, to a strain element of the force sensor, force or moment which has been received; and a control section configured to detect a direction of the force or moment received by the stick body, on the basis of an output of the force sensor, and to generate an operation signal for an object to be operated in accordance with the direction detected.

10 Claims, 4 Drawing Sheets

(56) References Cited

U.S. PATENT DOCUMENTS

2013/0265233 A1   10/2013  Obermeyer et al.
2015/0153842 A1    6/2015  Obermeyer et al.
2016/0304379 A1* 10/2016  Wright ................... C02F 11/12
2021/0191427 A1*  6/2021  Gunter ................ G05D 1/0891

* cited by examiner

FIG. 3
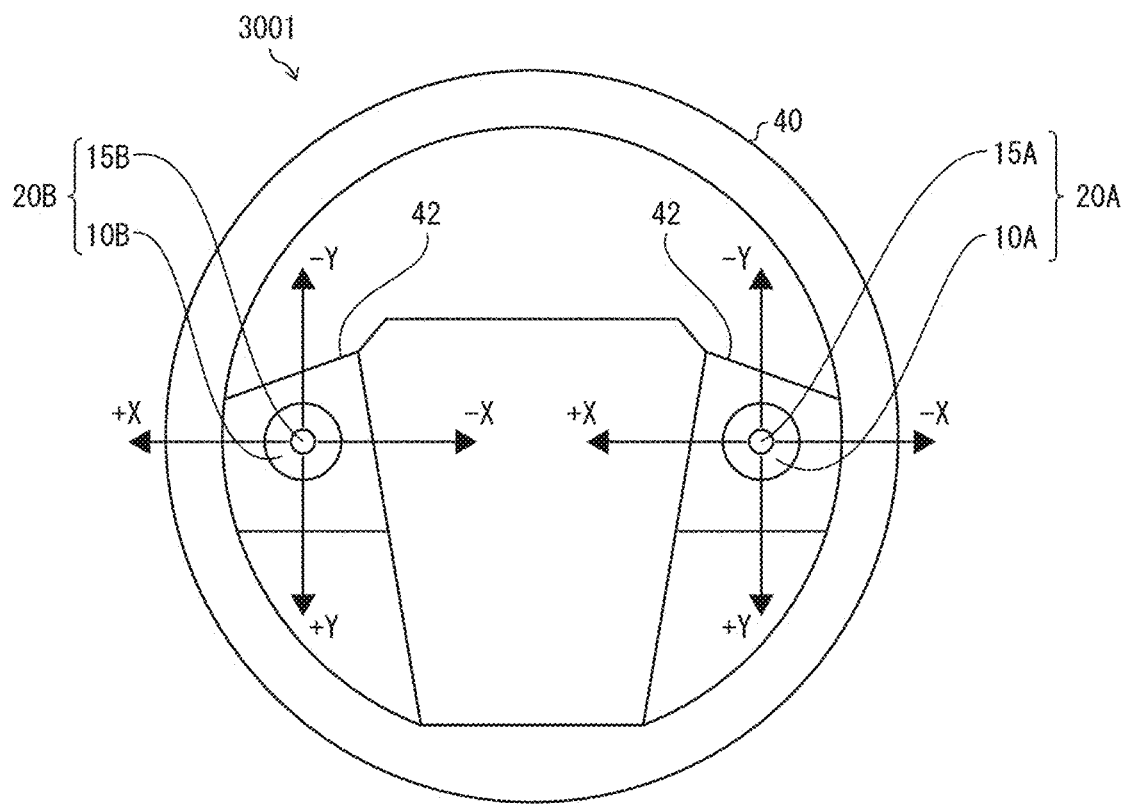
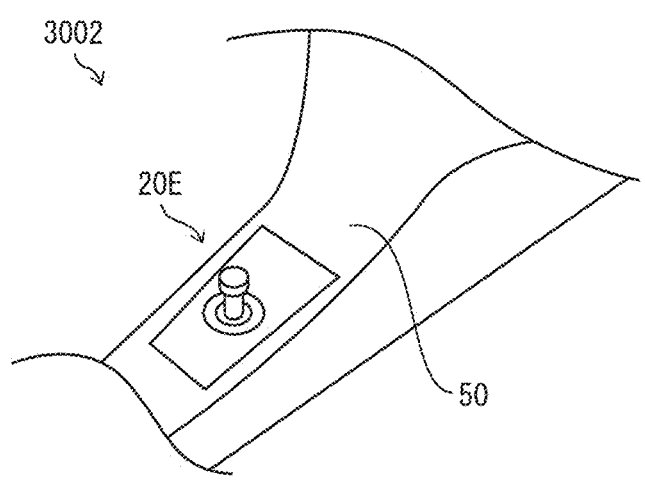

OPERATION SYSTEM AND OPERATION METHOD USING FORCE SENSOR, AND PROGRAM

This Nonprovisional application claims priority under 35 U.S.C. § 119 on Patent Application No. 2021-009880 filed in Japan on Jan. 25, 2021, the entire contents of which are hereby incorporated by reference.

TECHNICAL FIELD

The present invention relates to an operation system and an operation method each of which uses a force sensor, and a program.

BACKGROUND ART

For example, in passenger vehicles etc., electrification of in-vehicle equipment has been advanced. Such advancement has led to setting up many operation switches in the passenger vehicles etc. However, in cases where there are many operation switches, a large area is necessary for setting up the operation switches. Moreover, in a case where there are many operation switches in a vehicle, the following problems occur: a driver may be given an impression that operations are complicated; and it is difficult to understand where each operation switch is located. Therefore, it is preferable that the number of operation switches be as small as possible.

Further, in a case where there are many operation switches, an operation switch may be located far from a steering wheel. The operation switch located far from the steering wheel may require the driver to check a location of the operation switch. However, checking the location of the operation switch would take driver's eyes away from a direction ahead of the vehicle. This is dangerous.

For example, Patent Literature 1 discloses a low-cost, sturdy substitute for a multiaxial computer input device, and discloses, as an examples of such a substitute, a six-axis computer input device and a high resolution transducer element. It is considered that this makes it possible to provide a simple six-axis computer input device which is composed of the smallest possible number of components and which can be easily manufactured.

CITATION LIST

Patent Literature

[Patent Literature 1]
Japanese Patent Application Publication Tokukai No. 2011-090707

SUMMARY OF INVENTION

Technical Problem

However, the above-described conventional feature disclosed in Patent Literature 1 specifically uses, for example, an optical transducer array composed of one or more light emitters and one or more light detectors, or one or more ionically conductive elements. However, there is a demand for an operation system which has a simpler configuration than the conventional feature and which makes it possible to reduce the number of operation switches.

An object of an aspect of the present invention is to provide an operation system which has a simpler configuration than a conventional feature and which can lead to reduction in the number of operation switches, an operation method, and a program.

Solution to Problem

An operation system in accordance with an aspect of the present invention includes: a force sensor; and a stick body configured to transmit, to a strain element of the force sensor, force or moment which has been received; and a control section configured to detect a direction of the force or moment received by the stick body, on the basis of an output of the force sensor, and to generate an operation signal for an object to be operated in accordance with the direction detected.

An operation method in accordance with an aspect of the present invention includes the steps of: detecting, from an output of a force sensor, a direction of force or moment applied to the force sensor; and generating an operation signal for an object to be operated in accordance with the direction detected.

An operation device in accordance with an aspect of the present invention includes: a force sensor; and a stick body configured to transmit, to a strain element of the force sensor, force or moment which has been received.

The control section in accordance with each aspect of the present invention may be realized by a computer. In this case, an aspect of the present invention includes an operation program of the operation system and a computer-readable storage medium in which the operation program is stored, the operation program causing the control section to be realized by the computer by causing the computer to operate as each section (software component) of the control section.

Advantageous Effects of Invention

An aspect of the present invention makes it possible to provide an operation system which has a simpler configuration than a conventional feature and which can lead to reduction in the number of operation switches, an operation method, and a program.

BRIEF DESCRIPTION OF DRAWINGS

FIG. 3 is a diagram illustrating an arrangement of operation sections in accordance with Embodiment 1.

DESCRIPTION OF EMBODIMENTS

Embodiment 1

Figure 1:
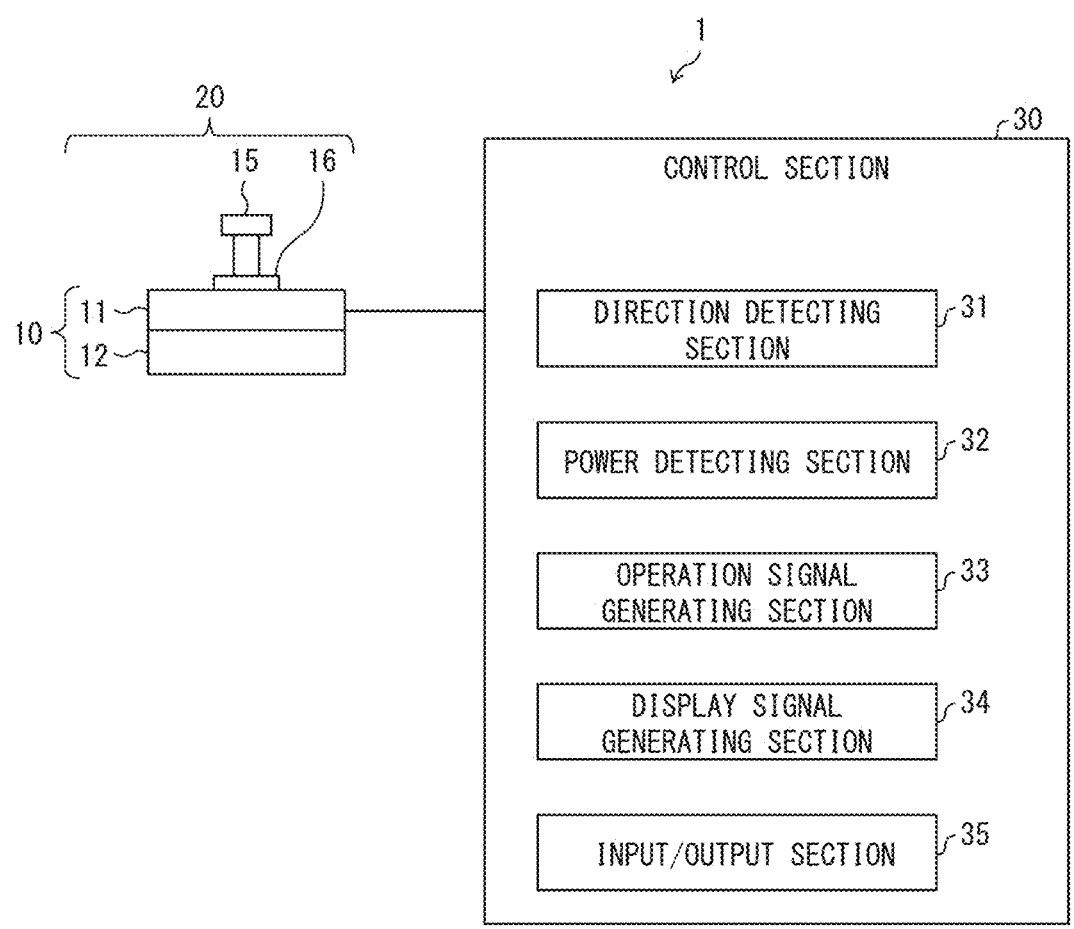
FIG. 1 is a diagram illustrating an overall configuration of an operation system in accordance with Embodiment 1 of the present invention.

The following description will discuss an embodiment of the present invention in detail with reference to drawings. FIG. 1 is a diagram illustrating an overall configuration of an operation system 1 in accordance with Embodiment 1 of the present invention. The operation system 1 is used for controlling the state of in-vehicle equipment of a mobile body (for example, a vehicle). As illustrated in FIG. 1, the operation system 1 includes a six-axis force sensor 10 (an example of "force sensor" in claims), a stick body 15, and a control section 30. Note that a member including the six-axis force sensor 10 and the stick body 15 is also referred to as "operation section (or operation device) 20". The six-axis force sensor 10 includes a strain element 11 and a base part 12. The stick body 15 is fixed to the strain element 11 via a support part 16. The control section 30 is connected to the six-axis force sensor 10 so as to be able to receive an output of the six-axis force sensor 10. Note that the "stick body" in the present embodiment is a substantially rod-shaped operating tool which can be pushed down or depressed by an operator's finger, but the form of the stick body is not limited. As will be described later, the stick body can be anything that can be configured to transmit received force or moment to the strain element 11 of the six-axis force sensor 10.

The stick body 15 is arranged upright with respect to the strain element 11. FIG. 1 illustrates, as an example of the stick body 15, a cylindrical rigid body whose upper end portion has an increased diameter. The stick body 15 is configured to transmit the received force or moment to the strain element 11 of the six-axis force sensor 10.

Specifically, when the six-axis force sensor 10 is seen from above, the stick body 15 is supported by the support part 16 so that an operator (e.g., a driver) can push (push down) the stick body 15, like a joystick, in top, bottom, right and left directions or rotate the stick body 15 about the axis of a cylinder. The operator can also push the stick body 15 downward so as to depress the stick body 15 into the strain element 11. The stick body 15 returns to its original upright position when the operator releases his/her hand. In the present embodiment, the force means force which is applied to the stick body 15 in the top, bottom, right and left directions and a downward direction. Further, the moment means force which is applied to the stick body 15 and which causes the stick body 15 to rotate about the axis. In the following description, the force and the moment may be collectively referred to simply as "force".

The support part 16 is attached to the strain element 11, for example, with use of a screw, and the force or moment received by the stick body 15 is transmitted to the strain element 11. The six-axis force sensor 10 outputs, to the control section 30, an output signal corresponding to the direction and the magnitude of the force or moment applied to the strain element 11. For example, in a case where the strain element 11 is of a cross beam type, the stick body 15 is fixed to a center part of a cross beam.

(Control Section)

The control section 30 detects the direction of the force or moment received by the stick body 15, on the basis of the output of the six-axis force sensor 10. Then, the control section 30 generates an operation signal for an object to be operated in accordance with the direction thus detected. The control section 30 also detects the magnitude of the force or moment received by the stick body 15, on the basis of the output of the six-axis force sensor 10. Then, the control section 30 generates an operation signal in accordance with the magnitude of the force or moment thus detected. This configuration allows the control section 30 to change the content of operation and the speed of the operation, the amount of the operation, and/or the like, in accordance with the magnitude of the force or moment received by the stick body 15 in addition to the direction of the force or moment. The object to be operated will be described later in detail.

The control section 30 includes a direction detecting section 31, a power detecting section 32, an operation signal generating section 33, a display signal generating section 34, and an input/output section 35. The direction detecting section 31 detects the direction of the force received by the stick body 15, on the basis of the output of the six-axis force sensor 10, and outputs the direction thus detected, to the operation signal generating section 33. The power detecting section 32 detects the magnitude of the force received by the stick body 15, on the basis of the output of the six-axis force sensor 10, and outputs the magnitude thus detected, to operation signal generating section 33.

The operation signal generating section 33 generates the operation signal for the object to be operated, in accordance with the direction of the force obtained from the direction detecting section 31 and the magnitude of the force obtained from the power detecting section 32. The operation signal is a signal for controlling the state of the in-vehicle equipment of the mobile body. This configuration makes it possible to control, with a small number of control sections, respective states of a large number of pieces of the in-vehicle equipment in, for example, a passenger vehicle. The operation signal generating section 33 outputs the operation signal thus generated, to the outside via the input/output section 35. The operation signal generating section 33 also outputs the operation signal to the display signal generating section 34. The display signal generating section 34 generates a display signal in accordance with the direction of the force which has been obtained from the operation signal generating section 33.

The input/output section 35 receives the output of the six-axis force sensor 10, and transmits this output of the six-axis force sensor 10, to the direction detecting section 31 and the power detecting section 32. Further, the input/output section 35 outputs the operation signal, which has been generated by the operation signal generating section 33, and the display signal, which has been generated by the display signal generating section 34.

Figure 2:
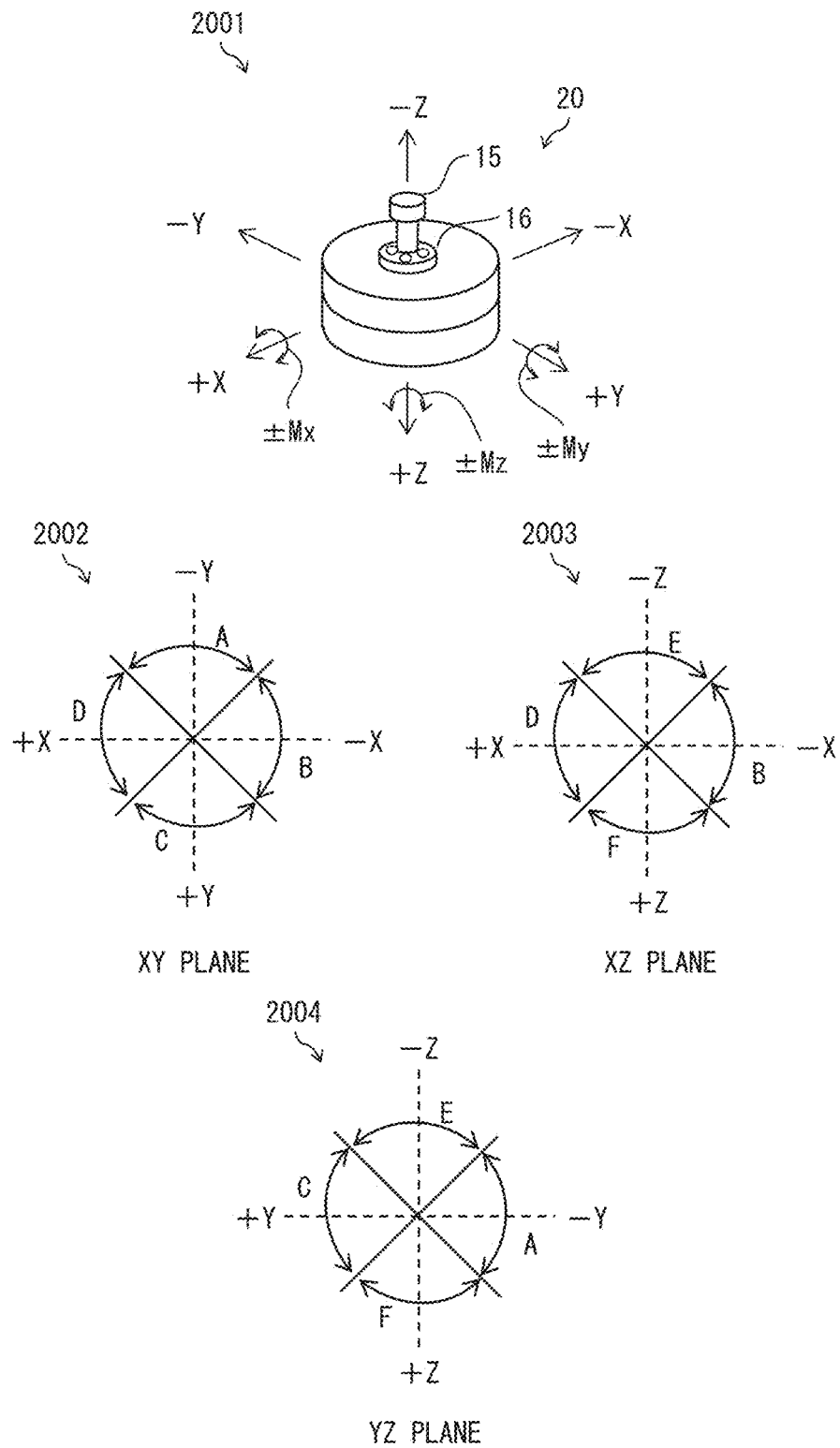
FIG. 2 is a diagram showing a configuration of an operation section in accordance with Embodiment 1, and respective directions of forces which are detected by a six-axis force sensor.

Next, the following description will discuss directions of forces which are detected by the direction detecting section 31. FIG. 2 is a diagram showing a configuration of the operation section 20, and respective directions of forces which are detected by the six-axis force sensor 10. The directions of the forces which are detected by the six-axis force sensor 10 are determined by a configuration of the strain element 11, and in the present Embodiment 1, such directions are directions as shown in 2001. Specifically, the directions of the forces are an X direction (+ direction and − direction; the same applies to the following directions), a Y direction, and a Z direction, which correspond to three axes orthogonal to each other, and an Mx direction which is a direction of a moment about an X axis, an My direction which is a direction of a moment about a Y axis, and an Mz direction which is a direction of a moment about a Z axis. The magnitude of the force applied by the operator to the stick body 15 is detected for each of these directions by the six-axis force sensor 10.

Meanwhile, respective directions of forces (excluding the moments) to be detected by the direction detecting section 31 are as follows. When viewed in an XY plane, as shown in 2002, when a resultant force vector of the forces (excluding the moments) which are detected in the X direction and the Y direction by the six-axis force sensor 10 is in a region A, the direction detecting section 31 detects that the direction of the force is in a −Y direction. In this way, the direction detecting section 31 detects all directions within a predetermined range as a predetermined one direction.

Accordingly, the direction detecting section 31 is also described to "determine" the direction. When the resultant force vector of the forces in the X direction and the force in the Y direction are in a region B, the direction detecting section 31 determines that the direction of the force is in the −X direction. When the resultant force vector of the forces in the X direction and in the Y direction are in a region C, the direction detecting section 31 determines that the direction of the force is in the +Y direction. When the resultant force vector of the forces in the X direction and in the Y direction are in a region D, the direction detecting section 31 determines that the direction of the force is in the +X direction. Note that each boundary between adjacent two of the regions A to D is at an angle of 45 degrees from each of the X axis and the Y axis. The same applies to each of the other boundaries.

Further, when viewed in an XZ plane, as shown in 2003, when a resultant force vector of the forces which are detected in the X direction and the Z direction by the six-axis force sensor 10 is in a region E, the direction detecting section 31 determines that the direction of the force is in a −Z direction. When the resultant force vector of the forces in the X direction and in the Z direction are in the region B, the direction detecting section 31 determines that the direction of the force is in the −X direction. When the resultant force vector of the forces in the X direction and in the Z direction are in a region F, the direction detecting section 31 determines that the direction of the force is in a +Z direction. When the resultant force vector of the forces in the X direction and in the Z direction are in the region D, the direction detecting section 31 determines that the direction of the force is in the +X direction Furthermore, when viewed in a YZ plane, as shown in 2004, when a resultant force vector of the forces which are detected in the Y direction and the Z direction by the six-axis force sensor 10 is in the region E, the direction detecting section 31 detects that the direction of the force is in a −Z direction. When the resultant force vector of the forces in the Y direction and in the Z direction are in the region A, the direction detecting section 31 determines that the direction of the force is in the −Y direction. When the resultant force vector of the forces in the Y direction and in the Z direction are in the region F, the direction detecting section 31 determines that the direction of the force is in the +Z direction. When the resultant force vector of the forces in the Y direction and in the Z direction are in the region C, the direction detecting section 31 determines that the direction of the force is in the +Y direction.

The above has described cases where the direction of the resultant force vector is viewed in each of the above three planes. In practice, those six regions A to F are three-dimensionally defined. Therefore, the direction detecting section 31 can determine the direction of the force depending on which one of those three-dimensional regions A to F the resultant force vector of three dimensions belongs to.

It should be noted that in the present embodiment, the direction detecting section 31 detects the direction of only the force in the region A, the region B, the region C, the region, D, and the region F, and outputs the direction thus detected. Further, with regard to the moment, the direction detecting section 31 detects the direction of only the moment about the Z-axis (±Mz), and outputs the direction thus detected.

The power detecting section 32 detects the magnitude of the force in the direction of the force which the direction detecting section 31 detects. That is, the power detecting section 32 detects the magnitude (scalar) of the above-described three-dimensional resultant force vector of the force which has been applied by the operator to the stick body 15.

It should be noted that, in the above-described detection method, in a case where the resultant force vector is significantly apart from both of an X-axis direction and a Y-axis direction, an erroneous operation is considered to have been made. Accordingly, in such a case, the direction detecting section 31 may determine that the direction is undetectable. Further, instead of the above-described detection method, the direction detecting section 31 may simply detect the direction of a largest component force vector from among the X-axis direction, the Y-axis direction and the Z-axis direction. Furthermore, the power detecting section 32 may detect the scalar of the component force vector in the X-axis direction, the Y-axis direction, or the Z-axis direction instead of the scalar of the resultant force vector. This is because the operator usually applies force in an axis direction which is intentionally determined, so that a large force is applied in that axis direction and a component force(s) in the other direction(s) is/are very small.

In addition, the power detecting section 32 may determine, as the magnitude of the force applied by the operator to the stick body 15, the magnitude of the largest component force among component forces in respective axis directions instead of the magnitude of the three-dimensional resultant force vector described above.

The moment detectable by the operation section 20 of the present Embodiment 1 is only the moment ±Mz about the Z axis. This moment is generated by twisting the stick body 15 clockwise or counterclockwise. However, the operation section 20 may also be an operation section which can detect and use the moment about the X axis or Y axis. For example, the operation section 20 may be configured such that a handle is attached to a side surface of the strain element 11 of the six-axis force sensor 10, and the moment about the X axis or Y axis can be applied by twisting the handle (not illustrated).

(Arrangement of Operation Sections)

Next, the following description will discuss an arrangement of operation sections 20 and objects to be operated, with reference to the drawings. FIG. 3 is a diagram illustrating an arrangement of the operation sections 20. In the present embodiment, as illustrated as 3001 in FIG. 3, two operation sections 20A and 20B are located on a steering wheel 40 of a vehicle. Such a configuration allows a driver of a passenger car or the like to operate in-vehicle equipment without taking his/her eyes away from the direction ahead of the vehicle. Specifically, the two operation sections 20A and 20B are provided on front sides of spoke portions 42 in right and left parts of the steering wheel 40. Since the operation sections 20A and 20B are provided on the spoked portions 42 of the steering wheel 40, there is an advantage that the driver does not need to take his/her eyes away from the direction ahead of the vehicle when the driver makes an operation on the operation section 20A or 20B. For both of the operation sections 20A and 20B, the left-right direction of a drawing sheet of FIG. 3 is defined as ±X directions, and the top-bottom direction of a drawing sheet of FIG. 3 is defined as ±Y directions. Although only the front side of the steering wheel 40 is illustrated in FIG. 3, two operation sections 20C and 20D are also provided on back sides of the spoke portions 42 in the right and left parts of the steering wheel 40. Hereinafter, when the operation sections 20 are each individually referred to, each operation section 20 is referred to with a specific reference sign, for example, referred to as "operation section 20A", and when a plurality of operation sections 20A, 20B etc. are collectively referred to, the plurality of operation sections 20A, 20B etc. are referred to as "operation section 20".

As shown as 3002 in FIG. 3, an operation section 20E is arranged on a center console 50 on the left side of the driver's seat. The center console 50 is at a position which the driver can touch if the driver puts his/her left hand down. This has an advantage that the driver does not need to take his/her eyes away from the direction ahead of the vehicle when the driver makes an operation on the operation section 20E. Further, there is also an advantage that a person who sits in the passenger seat can make an operation on the operation section 20E. However, it is preferable that the operation to be made by the driver be not set as an operation to be made via the operation section 20E. Note that the arrangement of the operation sections 20 is not limited to the above-described examples. For example, an operation section 20 may be attached on an inner side of the door on a driver's seat side.

(Objects to be Operated Via Operation Sections)

The objects to be operated via the operation sections 20A to 20D and the content of operations to the objects to be operated are set, for example, as follows.

TABLE 1

| Location of operating section | Operating section | Direction | Object to be operated | Content of operation |
|---|---|---|---|---|
| Front side of steering wheel | 20A | +X | Driver's seat power window | Open |
| | | −X | | Close |
| | | +Y | Driver's seat backrest | Bring up |
| | | −Y | | Bring down |
| | | +Mz | Engine | Start |
| | | −Mz | | Stop |
| | 20B | +X | Audio music selection | Forward |
| | | −X | | Back |
| | | +Y | Audio volume | Increase |
| | | −Y | | Decrease |
| | | +Mz | Wiper | Wipe once |
| | | −Mz | | Wipe at low speed |
| Back side of steering wheel | 20C | +X | Height of driver's seat | Move up |
| | | −X | | Move down |
| | | +Y | Driver's seat | Move forward |
| | | −Y | | Move backward |
| | | +Mz | Gasoline filling port | Open |
| | | −Mz | Washer liquid | Spray |
| | 20D | +X | Air volume of air conditioner | Increase |
| | | −X | | Decrease |
| | | +Y | Temperature of air conditioner | Increase |
| | | −Y | | Decrease |
| | | +Mz | Wiper | Wipe at high speed |
| | | −Mz | | Stop |

Further, objects to be operated via the operation section 20E and the content of operation to the objects to be operated are set, for example, as follows.

TABLE 2

| Operating section | Direction | Object to be operated | Content of operation |
|---|---|---|---|
| 20E | +X | Passenger seat power window | Open |
| | −X | | Close |
| | +Y | Right rear seat power window | Open |
| | −Y | | Close |
| | +Mz | Left rear seat power window | Open |
| | −Mz | | Close |

The objects to be operated and the content of operations which are shown in Tables 1 and 2 are merely examples, and the operation to be assigned to each direction of each of the operation sections 20 can be arbitrarily decided. Further, in cases of an operation in which the speed of operation or the amount of operation is adjustable, for example, the operation of opening/closing a power window or the operation of changing the air volume of an air conditioner, or the like operation, the speed or amount of such an operation can be changed by the magnitude of the force pushing the stick body 15. That is, as the force pushing the stick body 15 is increased, the speed of opening/closing the power window or the amount of change in the air volume of the air conditioner can be increased. However, in cases of an operation of turning an engine on/off, an operation of opening a gasoline filling port, an operation of a wiper, and the like operations, the magnitude of the force pushing the stick body 15 does not affect the content of operation.

(Prevention of Erroneous Operation)

In making an operation with use of the operation section 20, it is preferable that prevention of an erroneous operation be possible. In the present Embodiment 1, a plurality of steps of operation are to be made via the operation section 20, so that an erroneous operation is prevented. Specifically, the operation signal generating section 33 generates an operation signal after the direction detecting section 31 detects the direction of the force or moment a plurality of times. This configuration makes it possible to prevent an erroneous operation.

For example, the operator releases his/her hand from the stick body 15 after pushing the stick body 15 in a direction assigned to an operation to be carried out. Then, the stick body 15 once returns to its original position. At this time point, the direction detecting section 31 detects the force applied in the direction. This step is the step of selecting the operation. Then, the operator pushes the stick body 15 in the Z-axis direction. That is, the stick body 15 is pushed downward. At this time point, the direction detecting section 31 detects the force that is applied downward. This step is the step of determining the content of operation. Next, the operator pushes the stick body 15 again in the direction assigned to the operation to be carried out. At this time point, the direction detecting section 31 detects the force applied in the direction. In this step, the operation signal generating section 33 generates the operation signal. That is, in this step, the operation is carried out. Since the operation is carried out as a result of applying the force to the stick body 15 a plurality of times as described above, the operation is not carried out in a case where the stick body 15 is erroneously pushed only one time.

Further, there may be a method for cancelling an operation. For example, it is possible to have a configuration in which when the stick body 15 is pushed in a certain direction and then pushed in another direction other than downward, an immediately preceding operation is cancelled. Alternatively, it is possible to have a configuration in which when no operation is made for a predetermined time after a first operation is made, the first operation is cancelled. Such a multi-step operation is not limited to the above-described method. Meanwhile, it is preferable that the operator can check what type of operation he/she has made. Furthermore, it is preferable that the operator be able to check which one of the step of selecting the operation (selection step), the step of determining the operation (determination step) and the step of carrying out the operation (execution step) the current step is.

(Display Signal)

Next, the following description will discuss the function of the display signal generating section 34. The display signal generating section 34 generates a display signal for displaying the type of the operation signal which is generated by the operation signal generating section 33. This configuration allows the operator to check the content of operation which has been made by the operator. For example, in a case where the operator first pushes the stick body 15 in a certain direction, the display signal generating section 34 generates a signal for displaying, on the operation display section 62, the content of operation (for example, the words "Open right window") corresponding to that certain direction. In this step, the content of operation has been selected. Next, when the operator depresses the stick body 15, the display signal generating section 34 generates, for example, a signal for changing a color to be displayed. In this step, the content of operation has been determined. Next, the display signal generating section 34 then generates, for example, a signal for causing the display to flash in a case where the operator pushes the stick body 15 again in the direction in which the stick body 15 is first pushed. In this step, the operation is carried out. As described above, the operator can visually check which step the content of operation made by the operator is in.

Figure 4:
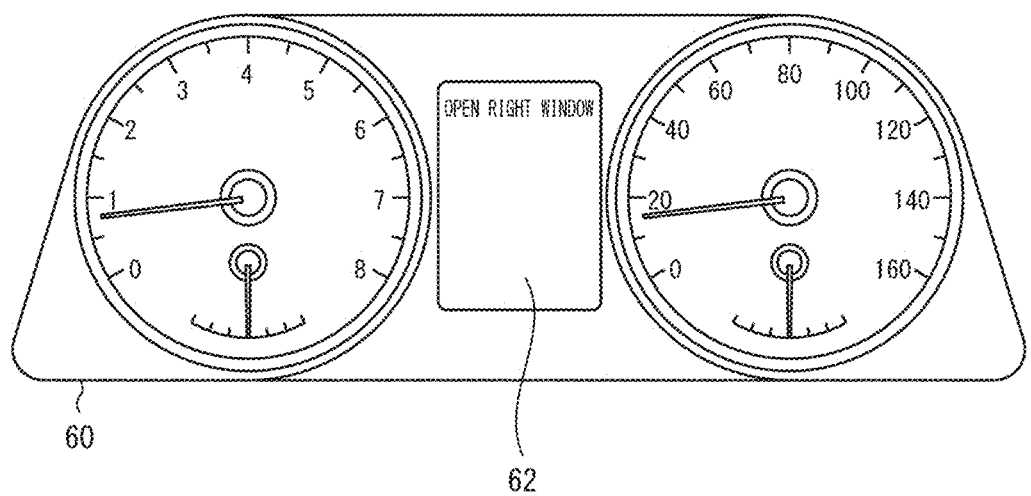
FIG. 4 is a diagram illustrating an arrangement of an operation display section in accordance with Embodiment 1.

FIG. 4 is a diagram illustrating a location of the operation display section 62 in accordance with Embodiment 1. As illustrated in FIG. 4, the operation display section 62 is located, for example, in an instrument panel 60 in front of the driver's seat. FIG. 4 indicates a state in which the words "Open right window" are displayed in white as the content of operation, on the operation display section 62. This means that in the current step, an operation to open the right window (driver's seat-side window) has been selected. That is, when the stick body 15 of the operation section 20A is first pushed in the +X direction, the words are displayed in white (selection step). When the stick body 15 is then depressed, the words are displayed in red (determination step). When the stick body 15 is then pushed in the +X direction in which the stick body 15 is pushed first, the words flashes (execution step). This configuration allows the operator to visually check which step the content of operation made by the operator is in. Instead of generating a signal to be displayed on the operation display section 62, the display signal generating section 34 may, for example, generate an audio signal and present an operation step to the operator with sound or voice.

According to the operation system 1 in accordance with Embodiment 1 described above, for example, it is possible to carry out, with use of only the operation section 20A, six operations to three objects to be operated. This makes it possible to have a simpler configuration as compared to a conventional feature, and consequently to reduce the number of operation switches in the vehicle. Further, since the operation section 20 is located in a position which a driver's hand can easily reach, for example, on the steering wheel or the center console, the driver does not need to take his/her eyes away from the direction ahead of the vehicle while driving.

(Variation 1)

In Embodiment 1 described above, the operation signal generating section 33 generates an operation signal, on the basis of the direction and the magnitude of the force which the stick body 15 has received. However, the operation signal generating section 33 may generate an operation signal, on the basis of only the direction of the force which the stick body 15 has received. In this case, the operation signal generating section 33 generates only a signal for carrying out a predetermined operation, without including a signal indicative of a level of the speed of operation, the magnitude of the amount of operation, and the like.

(Variation 2)

In Embodiment 1 described above, the stick body 15 is fixed to the strain element 11 via the support part 16, but the stick body 15 may be fixed directly to the strain element 11 by welding or the like. Since the strain element 11 deforms only to a small extent, the stick body 15 may have a certain degree of elasticity. This configuration allows the stick body 15 to deform in accordance with force received and also to transmit, to the strain element 11, force corresponding to the force received. The operator can recognize the direction in which the stick body 15 is deformed and check the operation which he/she has made.

(Variation 3)

In Embodiment 1 described above, the stick body 15 is exemplified by a cylindrical body whose upper end portion has an increased diameter. However, the shape of the stick body 15, in particular, the shape of the upper end portion, can be any shape as long as the shape allows the operator to easily make an operation. For example, the upper end portion of the stick body 15 may be a chamfered rectangle so that the operator can easily apply forces in four directions and forces about respective axes.

Software Implementation Example

Control blocks of the control section 30 (particularly, the direction detecting section 31, the power detecting section 32, the operation signal generating section 33 and the display signal generating section 34) can be realized by a logic circuit (hardware) provided in an integrated circuit (IC chip) or the like or can be alternatively realized by software. In the latter case, the functions of the control section 30 are each implemented by, for example, a computer which executes instructions of a program P that is software.

Figure 5:
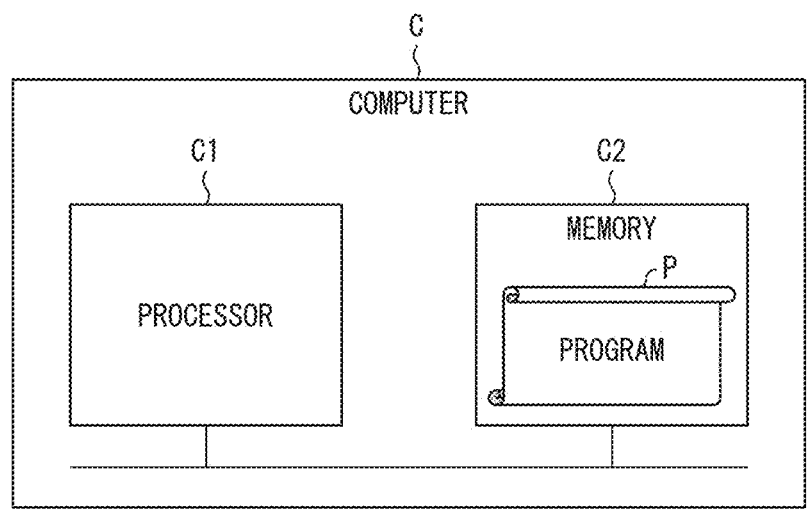
FIG. 5 illustrates one configuration example of a case where a control section is realized by a computer.

FIG. 5 illustrates an example of such a computer (hereinafter, referred to as "computer C"). The computer C includes at least one processor C1 and at least one memory C2. The memory C2 stores a program P for causing the computer C to operate as the control section 30. In the computer C, the processor C1 reads the program P from the memory C2 and executes the program P, so that the functions of the control section 30 are implemented.

Examples of the processor C1 encompass a central processing unit (CPU), a graphic processing unit (GPU), a digital signal processor (DSP), a micro processing unit (MPU), a floating point number processing unit (FPU), a physics processing unit (PU), a micro controller, and a combination thereof. Examples of the memory C2 encompass a flash memory, a hard disk drive (HDD), a solid state drive (SSD), and a combination thereof.

Note that the computer C can further include a random access memory (RAM), in which the program P is loaded when the program P is to be executed and in which various kinds of data are temporarily stored. The computer C can further include a communication interface through which data can be transmitted to and received from another device. The computer C can further include an input/output interface through which an input device such as a keyboard and a mouse and/or an output device such as a display and a printer is/are connected to the computer C.

The program P can be stored in a non-transitory, tangible storage medium M capable of being read by the computer C. Examples of such a storage medium M encompass a tape, a disk, a card, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

[Supplementary Note]

The present invention is not limited to the embodiments, but can be altered by a skilled person in the art within the scope of the claims. The present invention also encompasses, in its technical scope, any embodiment derived by combining technical means disclosed in differing embodiments. For example, the embodiment described above employs a six-axis force sensor as the force sensor. However, the force sensor is not limited to the six-axis force sensor. For example, the force sensor can be a three-axis force sensor. Further, a combination of forces and/or moments to be detected can be arbitrarily decided. For example, the force sensor may be a three-axis force sensor which detects the force in the X-axis direction, the moment about the Y axis and the moment about the Z axis, or a three-axis force sensor which detects the moment about the X axis, the force in the Y-axis direction, and the force in the Z-axis direction.

REFERENCE SIGNS LIST 1 operation system
10 six-axis force sensor
11 strain element
12 base part
15 stick body
16 support part
20 operation section
30 control section
31 direction detecting section
32 power detecting section
33 operation signal generating section
34 display signal generating section
35 input/output section
50 center console
60 instrument panel
62 operation display section

The invention claimed is:

1. An operation system comprising:
a force sensor;
a stick body configured to transmit, to a strain element of the force sensor, a force or a moment which has been received; and
a control section configured to
detect a direction of the force or the moment received by the stick body based on an output of the force sensor a plurality of times before generating an operation signal, and
generate an operation signal after the direction of the force or the moment being detected a plurality of times in a same direction as a result of applying the force to the stick body in the same direction a plurality of times, the operation signal being for an object to be operated in accordance with the direction detected,
wherein the direction is a direction assigned to an operation to be carried out, and the control section generates the operation signal for the object to be operated in accordance with the direction detected in a case where between applications of the force to the stick body in the same direction a plurality of times, a downward force is applied to the stick body.

2. The operation system as set forth in claim 1, wherein the control section is further configured to
detect a magnitude of the force or the moment received by the stick body, and
generate the operation signal in accordance with the direction and the magnitude of the force or the moment detected.

3. The operation system as set forth in claim 1, wherein the operation signal is a signal for controlling a state of in-vehicle equipment of a mobile body.

4. The operation system as set forth in claim 3, wherein at least the force sensor and the stick body are provided on a steering wheel of the mobile body or a center console of the mobile body.

5. The operation system as set forth in claim 1, wherein the control section is configured to generate a display signal for displaying a type of the operation signal to be generated.

6. A computer-readable non-transitory storage medium in which an operation program is stored, the operation program being a program for causing a computer to function as an operation system as recited in claim 1, and the operation program causing the computer to function as the control section.

7. The operation system as set forth in claim 1, wherein the control section is configured to not generate the operation signal in response to the direction of the force or the moment being detected one time.

8. The operation system as set forth in claim 1, wherein the control section is further configured to
detect a first force or moment received by the stick body before generating the operation signal,
detect a second force or moment received by the stick body before generating the operation signal,
detect a third force or moment received by the stick body and then generating the operation signal.

9. An operation method comprising the steps of:
detecting, from an output of a force sensor, a direction of a force or a moment applied to the force sensor a plurality of times before generating an operation signal; and
generating an operation signal after detecting the direction of the force or the moment applied to the force sensor a plurality of times in a same direction as a result of applying the force to the force sensor in the same direction a plurality of times, the operation signal being for an object to be operated in accordance with the direction detected,
wherein the direction is a direction assigned to an operation to be carried out, and the control section generates the operation signal for the object to be operated in accordance with the direction detected in a case where between applications of the force to the stick body in the same direction a plurality of times, a downward force is applied to the stick body.

10. The operation method of claim 9 further comprising the steps of:
detecting a first force or moment output by the force sensor before generating the operation signal,
detecting a second force or moment output by the force sensor before generating the operation signal,
detecting a third force or moment output by the force sensor and then generating the operation signal.

* * * * *